United States Patent Office 3,749,666
Patented July 31, 1973

3,749,666
METHOD FOR THE IMPROVEMENT OF PETROLEUM DISTILLATE
William H. Lockwood, Jr., Hightstown, and Hugh P. Herbert, Trenton, N.J., assignors to Cities Service Oil Company
No Drawing. Filed Oct. 30, 1970, Ser. No. 85,742
Int. Cl. C10g *29/00*
U.S. Cl. 208—278                                    8 Claims

ABSTRACT OF THE DISCLOSURE

A process for improving petroleum distillate quality is disclosed. In particular, sulfuric acid and cracking catalyst are utilized to remove impurities which cause instability and poor color characteristics in petroleum distillates. The distillate is emulsified with acid, preferably spent sulfuric acid alkylation catalyst, and spent cracking catalyst with subsequent removal of the supernatant liquid. The improved petroleum distillate is then available for use or blending with other distillate streams.

BACKGROUND OF THE INVENTION

This invention relates to the refining of petroleum and processes therefor. More particularly, this invention relates to the utilization of spent alkylation acid and spent cracking catalyst in a manner wherein impurities which cause instability and poor color are removed from petroleum distillate.

Petroleum distillate and other refined petroleum products often contain undesirable quantities of basic nitrogen compounds and other gum forming compounds which must be removed from the hydrocarbon streams in order to give a clear product, which is desirable for consumption and which exhibits less tendency to form a sludge. Considerable effort has been given to the improvement of hydrocarbon distillate streams and in particular, those obtained from the production of coker naphtha, in which basic nitrogen, mercaptan concentration, stability and color must be maintained at a suitable level so that the distillate may be sold as a product with no tendency to sludge, no odor and a pleasing color.

What is required is a process for the treating of hydrocarbon streams, particularly petroleum distillate streams, for the removal of basic nitrogen, mercaptans, and the improvement of stability and color of the streams such that they may be commercially sold and accepted. The method for treating the hydrocarbon distillate streams for improving the quality thereof must be an economic and continuous process.

It is an object of the present invention to provide a method for treating petroleum distillate streams for the removal of impurities therefrom.

It is a further object of the present invention to provide a method for the improvement of hydrocarbon distillate streams by the removal of nitrogen compounds and other gum forming components so as to provide a clear product which has less tendency to form a sludge.

It is still a further object of the present invention to utilize spent cracking catalyst and spent sulfuric acid alkylation catalyst for the improvement of petroleum distillate streams so as to render them stable with a pleasing color and low nitrogen and mercaptan content.

With these and other objects in mind, the present invention may be more fully disclosed with particular reference to the following discussion.

SUMMARY OF THE INVENTION

The objects of the present invention are achieved by a process for the improving of stability and color properties of a hydrocarbon refinery petroleum product stream, for example petroleum distillate. The process comprises emulsifying the petroleum stream with sulfuric acid and then mixing a cracking catalyst with the emulsified mixture. The hydrocarbon and acid phases are separated as by settling, with the improved petroleum distillate being decanted as a supernatant liquid. Generally, the acid is spent alkylation acid and is utilized with spent cracking catalyst. Preferred cracking catalyst is silica-alumina, having a surface area of about 50 m.$^2$/gm. to 150 m.$^2$/gm. The temperature of the process is maintained at about 70° F. to about 150° F. The process may include the step of blending the improved hydrocarbon refinery petroleum product supernatant liquid with unimproved hydrocarbon refining petroleum product for the improvement thereof and to yield better economics within the refinery system.

DETAILED DESCRIPTION OF THE INVENTION

This invention discloses a process for the improvement of petroleum products. In the particular disclosure herein, the improvement is directed towards the enhancement of petroleum distillate quality. However, it should be understood that the improvement of stability and color properties for any hydrocarbon refining petroleum product stream may be obtained by the process of the present invention.

In a preferred embodiment, the invention utilizes spent alkylation acid and spent cracking catalyst in a novel manner wherein impurities that cause instability and poor color are removed from the petroleum distillate. The process of the invention is carried out by emulsifying the distillate with the alkylation acid at a predetermined temperature. This step is followed immediately by the addition of a cracking catalyst. The mixture is stirred and allowed to settle with the supernatant liquid removed for use or blending with other components. The alkylation acid and cracking catalyst are then recycled for further process use. In particular, it has been found that spent alkylation acid, i.e., acid having about 85 to 93% acid content and contaminated with water and hydrocarbons as obtained from an alkylation unit, may be utilized in the present invention in conjunction with spent cracking catalyst. Fresh acid of 90 to 98% acid content and fresh cracking catalyst may be utilized, although particular economic advantage is derived by using the spent acid and catalyst combination. By the use of both spent alkylation acid and spent cracking catalyst, the process yields an improved product as compared to the solitary use of only a spent alkylation acid or spent cracking catalyst. The combination thereof gives the new improved process for upgrading distillate quality.

Cracking catalysts most widely utilized are those of solid materials which are active in an acidic medium. Catalysts of this type possess one or more desirable characteristics such as thermal stability or mechanical strength whereby a wide range of suitable properties can be maintained. It is preferred that a synthetic silica alumina catalyst be utilized as it is a conventionally popular catalyst known to have been proposed heretofore. Such catalyst does not suffer the disadvantage of readily deteriorating and becoming inactive in the presence of water and does not prematurely degrade at elevated temperatures. It is within the disclosure of the present invention, however, that materials of an argillaceous nature, for example bentonite and montmorillonite, may be utilized, as well as synthetic materials, for example silica magnesia complexes and other normally used cracking catalysts. It is preferred, however, that silica-alumina catalysts be utilized with sulfuric acid as these are readily obtainable within a refinery and yield excellent results for the upgrading and improvement of the petroleum distillate.

It has been found that the combination of the two spent refinery materials, spent alkylation acid and spent cracking catalyst, assist each other in providing the improvements taught in this invention. Controlled acidity and addition of catalyst minimizes oil losses from the petroleum distillate. The surface area of the catalyst is generally preferred to be higher than 50 m.$^2$/gm. of catalyst so as to provide a large surface area upon which the acid may be absorbed, thereby minimizing the mass transfer problem of the acid phase wherein the petroleum distillate treating occurs. The surface area provided by the catalyst is many times greater than that which would be provided by the droplets of acid in a straight acid treating practice without the use of catalytic sites. The catalyst further increases the rate of settling of the fine acid particles by a gravity, electrostatic or centrifugal settling operation.

In the process of the present invention, the hydrocarbon refinery product stream, in particular petroleum distillate, is emulsified with an alkylation acid. Several seconds subsequent to the emulsification step a cracking catalyst is introduced into the emulsified mixture. After a predetermined contact time, generally from about one to about ten minutes, the catalyst and acid phase are allowed to settle and separate from the hydrocarbon phase. The separation yields a supernatant liquid of improved hydrocarbon refinery product from which the basic nitrogen, mercaptans and other color degrading materials have been removed. In general, the temperature range of the process should be maintained within about 70° F. to about 150° F., with a preferred temperature range of 110° F. to 140° F., yielding superior improved distillate quality. It has been found that spent alkylation acid having an 85 to 93% by weight acid content should be used with about 0.01 to about 0.5 pound of acid per 100 pounds of hydrocarbon refinery stream. The catalyst should be introduced in quantities of about 0.1 to 5.0 pounds of catalyst per 100 pounds hydrocarbon. The catalyst surface area as mentioned should be greater than about 50 m.$^2$/gm. up to about 150 m.$^2$/gm. with a specific range of catalyst surface area 75 m.$^2$/gm. to about 125 m.$^2$/gm. being preferred. It is preferred that the amount of catalyst used be such that about 10 to about 50 percent of the pore volume of the catalyst is equivalent to the quantity of acid utilized.

To more fully understand the advantages of the process of the present invention, the following example is disclosed.

EXAMPLE

Coker naphtha was treated with spent alkylation acid, spent cracking catalyst and a combination of spent alkylation acid and spent cracking catalyst in order that the advantages of the present invention could be observed. In the experiment, the coker naphtha was emulsified with 0.25 weight percent spent alkylation acid having an 87% by weight sulfuric acid content at 130° F., followed immediately, within 10 to 20 seconds, by the addition of 2.5 weight percent spent cracking catalyst. This mixture was stirred for five minutes and allowed to settle in a reaction vessel. The supernatant liquid was then removed and tested for basic nitrogen content in parts per million, mercaptan content in weight percent, stability by using the Pad test described in Petroleum Laboratory Method No. F21-61 of the E. I. du Pont de Nemours and Company, Inc. Test Manual, December 1962, and a basic color test, disclosure ASTM D-1500, used to control customer acceptance of the product. A chemical analysis of the coker naphtha utilized is indicated in Table 1 in which the API gravity, ASTM distillation, color, sulfur content and chromographic analysis of aromatics, olefins and saturates is given.

TABLE 1

Coker naphtha typical analysis

| | |
|---|---|
| API gravity | 46.2 |
| ASTM distillation: | |
| IBP ° F. | 300 |
| Percent: | |
| 10 ° F. | 340 |
| 20 ° F. | 349 |
| 30 ° F. | 354 |
| 40 ° F. | 364 |
| 50 ° F. | 373 |
| 60 ° F. | 382 |
| 70 ° F. | 392 |
| 80 ° F. | 404 |
| 90 ° F. | 422 |
| EP ° F. | 467 |
| Color (ASTMD-1500) | 1.0 |
| Sulfur (wt. percent) | 0.52 |
| F.I.A. analysis: | |
| Aromatics | 28.1 |
| Olefins | 16.4 |
| Saturates | 55.5 |

Presented in Table 2 is the spent cracking catalyst analysis used in this example. The catalyst exhibited a varied range of particle size which may be contained within the cracking catalyst, the general surface area requirements of greater than 50 square meters per gram, had an apparent density of 0.64 gm./cc. and pore volume of 0.5 cc./gm.

TABLE 2

Typical spent cracking catalyst analysis

| | |
|---|---|
| Pore volume, cc./gm. | 0.50 |
| Surface area, m$^2$./gm. | 106 |
| Particle size percent: | |
| Microns: | |
| 0–20 | 0 |
| 0–40 | 6 |
| 0–74 | 70 |
| 0–80 | 78 |
| 0–105 | 93 |
| 0–149 | 99 |
| Avg. particle size | 62.0 |
| Apparent density g./cc. | 0.64 |

The results of the testing are related in Table 3 in which the treatment utilized, basic nitrogen in parts per million tested, the mercaptan percentage or RSH percentage is shown, the stability and a color test utilized based upon color acceptance of the product. It can readily be determined that a far superior product was obtained with the process of the present invention over the individual use of cracking catalyst of spent alkylation acid or no treatment at all.

TABLE 3

| Treatment | Basic N$_2$, p.p.m. | Mercaptan, percent | Pad stability test | Color |
|---|---|---|---|---|
| 0.25% spent alkylation acid and 2.5% spent cracking catalyst | 2 | .0072 | 3 | 0.5 |
| 0.5% spent alkylation acid | 3 | .0095 | 7 | 1.0 |
| 5.0% spent cracking catalyst | 20 | .0107 | 8 | 1.5 |
| No treatment | 62 | .0119 | 16 | 2.5 |

Through the process of the present invention, petroleum distillate quality is enhanced by the utilization of otherwise useless spent alkylation acid and spent cracking catalyst to enhance hydrocarbon refinery petroleum product streams within the refinery. The process allows the removal of basic nitrogen and mercaptans along with other gum forming materials from hydrocarbon refinery petroleum product streams for the improvement of the hydrocarbon quality.

The present invention has been described herein with respect to particular embodiments thereof. It will be appreciated by those skilled in the art, however, that various changes and modifications may be made without departing from the scope of the invention.

Therefore, we claim:

1. A process for improving the stability and color properties of hydrocarbon refinery petroleum products which comprises
   (a) emulsifying a petroleum product with sulfuric alkylation acid at a temperature within the range of about 70° F. to about 150° F.,
   (b) mixing the emulsified petroleum product with synthetic silica-alumina cracking catalyst while maintaining the temperature of the mixture within the range of about 70° F. to about 150° F., and
   (c) recovering improved petroleum product from the process.

2. The process of claim 1 in which the improved petroleum product is recovered by settling the mixture of emulsified petroleum product, alkylation acid and cracking catalyst and removing improved petroleum product therefrom as a supernatant liquid.

3. The process of claim 2 in which the hydrocarbon refining petroleum product is petroleum distillate.

4. The process of claim 3 in which the synthetic silica-alumina cracking catalyst is spent cracking catalyst.

5. The process of claim 4 further comprising maintaining the temperature of the process at about 110° F. to about 140° F.

6. The process of claim 5 in which
   (a) about 0.01 to about 0.5 pound of alkylation acid are utilized for each 100 pounds of distillate, and
   (b) about 0.1 to about 5.0 pounds of synthetic silica-alumina cracking catalyst are utilized for each 100 pounds of distillate.

7. The process of claim 6 in which the catalyst surface area is about 50 $m.^2/gm.$ to about 150 $m.^2/gm.$ 8. The process of claim 1 further comprising blending the improved petroleum product with an unimproved hydrocarbon refinery petroleum product.

References Cited

UNITED STATES PATENTS

| | | | |
|---|---|---|---|
| 1,602,703 | 10/1926 | Pollock | 208—278 |
| 2,263,102 | 11/1941 | Proell | 208—278 |
| 2,220,697 | 11/1940 | Wirth | 208—269 |

FOREIGN PATENTS

| | | | |
|---|---|---|---|
| 763,857 | 5/1934 | France | 208—278 |
| 574,596 | 7/1923 | France | 208—278 |
| 423,324 | 1/1935 | Great Britain | 208—269 |

DELBERT E. GANTZ, Primary Examiner

J. M. NELSON, Assistant Examiner

U.S. Cl. X.R.

208—269 R